United States Patent
Nordbruch et al.

(10) Patent No.: US 12,479,436 B2
(45) Date of Patent: Nov. 25, 2025

(54) METHOD FOR THE AT LEAST ASSISTED MERGING OF A MOTOR VEHICLE INTO A TRAFFIC LANE

(71) Applicant: Robert Bosch Gmbh, Stuttgart (DE)

(72) Inventors: Stefan Nordbruch, Leonberg (DE); Carolin Noack, Hamburg (DE); Di Zhang, Stuttgart (DE); Kurt Eckert, Ditzingen (DE); Michael Kram, Renningen (DE); Rolf Nicodemus, Bietigheim-Bissingen (DE); Ruediger-Walter Henn, Weil Der Stadt (DE); Ulrich Schulmeister, Bietigheim-Bissingen (DE); Wolfgang Niem, Hildesheim (DE)

(73) Assignee: ROBERT BOSCH GMBH, Stuttgart (DE)

( * ) Notice: Subject to any disclaimer, the term of this patent is extended or adjusted under 35 U.S.C. 154(b) by 252 days.

(21) Appl. No.: 17/637,523

(22) PCT Filed: Jul. 27, 2020

(86) PCT No.: PCT/EP2020/071086
§ 371 (c)(1),
(2) Date: Feb. 23, 2022

(87) PCT Pub. No.: WO2021/058174
PCT Pub. Date: Apr. 1, 2021

(65) Prior Publication Data
US 2022/0289201 A1 Sep. 15, 2022

(30) Foreign Application Priority Data
Sep. 23, 2019 (DE) ...................... 10 2019 214 415.2

(51) Int. Cl.
*B60W 60/00* (2020.01)
*B60W 30/18* (2012.01)
(Continued)

(52) U.S. Cl.
CPC ...... *B60W 30/18163* (2013.01); *B60W 40/04* (2013.01); *B60W 50/04* (2013.01);
(Continued)

(58) Field of Classification Search
CPC .......... B60W 30/18163; B60W 50/04; B60W 40/04; B60W 60/0015; B60W 2540/043;
(Continued)

(56) References Cited

U.S. PATENT DOCUMENTS

| | | | |
|---|---|---|---|
| 10,089,876 B1 | 10/2018 | Ramasamy et al. | |
| 2011/0264337 A1* | 10/2011 | Takanashi | B60W 50/035 903/902 |

(Continued)

FOREIGN PATENT DOCUMENTS

| | | |
|---|---|---|
| CN | 108275149 A | 7/2018 |
| CN | 109715453 A | 5/2019 |

(Continued)

OTHER PUBLICATIONS

International Search Report for PCT/EP2020/071086, Issued Oct. 9, 2020.
(Continued)

*Primary Examiner* — Helal A Algahaim
*Assistant Examiner* — Michael T Dowling
(74) *Attorney, Agent, or Firm* — NORTON ROSE FULBRIGHT US LLP (57) ABSTRACT

A method for the at least assisted merging of a motor vehicle into a traffic lane. The method includes: determining that a motor vehicle is to be merged into the traffic lane, receiving signals from the surroundings, which represent surroundings
(Continued)

of the motor vehicle including at least partially the traffic lane, generating remote control signals for remotely controlling a lateral guidance and/or a longitudinal guidance of the motor vehicle based on the signals from the surroundings, in order to at least assist the motor vehicle during the remote control on the basis of the remote control signals in merging into the traffic lane, outputting the generated remote control signals. A device, a computer program, and a machine-readable memory medium, are also described.

19 Claims, 4 Drawing Sheets

(51) Int. Cl.
 B60W 40/04 (2006.01)
 B60W 50/04 (2006.01)
 G05D 1/00 (2006.01)
 H04W 4/44 (2018.01)
(52) U.S. Cl.
 CPC ....... B60W 60/0015 (2020.02); G05D 1/0022 (2013.01); H04W 4/44 (2018.02); B60W 2540/043 (2020.02); B60W 2556/45 (2020.02)
(58) Field of Classification Search
 CPC ... B60W 2556/45; H04W 4/44; G05D 1/0022
 USPC .......................................................... 701/23
 See application file for complete search history.

(56) References Cited

U.S. PATENT DOCUMENTS

| | | | |
|---|---|---|---|
| 2014/0235192 A1* | 8/2014 | Purnhagen | H04B 1/1676 |
| | | | 455/296 |
| 2017/0076607 A1* | 3/2017 | Linder | B60W 30/0956 |
| 2018/0122237 A1 | 5/2018 | Nascimento et al. | |
| 2018/0126906 A1* | 5/2018 | Gage | G06V 20/58 |
| 2019/0329708 A1* | 10/2019 | Hakki | B60Q 9/008 |
| 2020/0312142 A1* | 10/2020 | Su | G08G 1/0116 |

FOREIGN PATENT DOCUMENTS

| | | | | |
|---|---|---|---|---|
| DE | 102012218935 A1 | 4/2013 | | |
| DE | 102015214689 A1 | 2/2016 | | |
| DE | 102015209976 A1 | 12/2016 | | |
| DE | 102016205972 A1 | 11/2017 | | |
| DE | 102016212195 A1 | 1/2018 | | |
| DE | 102017200842 A1 | 7/2018 | | |
| DE | 102018003609 A1 | 10/2018 | | |
| DE | 102018007298 A1 | 3/2019 | | |
| EP | 3339124 A1 * | 6/2018 | | B60W 30/18163 |

OTHER PUBLICATIONS

Bernardini et al., "Security and Privacy in Vehicular Communications: Challenges and Opportunities," Vehicular Communications, vol. 10, 2017, pp. 13-28.

* cited by examiner

METHOD FOR THE AT LEAST ASSISTED MERGING OF A MOTOR VEHICLE INTO A TRAFFIC LANE

FIELD

The present invention relates to a method for the at least assisted merging of a motor vehicle into a traffic lane. The present invention further relates to a device, to a computer program and to a machine-readable memory medium.

BACKGROUND INFORMATION

German Patent Application No. DE 10 2012 218 935 A1 describes an expressway merging assistant.
German Patent Application No. DE 10 2018 003 609 A1 describes a method for assisting a vehicle.
German Patent Application No. DE 2018 007 298 A1 describes a method for route planning.
European Patent Application No. EP 3 339 124 A1 describes a system for autonomous driving.

SUMMARY

An object of the present invention includes providing efficient, at least assisted, merging of a motor vehicle into a traffic lane.

This object may be achieved with the aid of the present invention. Advantageous embodiments of the present invention are disclosed herein.

According to a first aspect of the present invention, a method is provided for the at least assisted merging of a motor vehicle into a traffic lane. In accordance with an example embodiment of the present invention, the method includes the following steps:
- determining that a motor vehicle is to be merged into the traffic lane,
- receiving signals from the surroundings, which represent surroundings of the motor vehicle that at least partially include the traffic lane,
- generating remote control signals for remotely controlling a lateral guidance and/or a longitudinal guidance of the motor vehicle based on the signals from the surroundings in order to at least assist the motor vehicle during a remote control based on the remote control signals in merging into the traffic lane, outputting the generated remote control signals.

According to a second aspect of the present invention, a device is provided, which is configured to carry out all steps of the method according to the first aspect.

According to a third aspect of the present invention, a computer program is provided, which includes commands which, upon execution of the computer program by a computer, for example, by the device according to the second aspect, prompt the computer to carry out a method according to the first aspect.

According to a fourth aspect of the present invention, a machine-readable memory medium is provided, on which the computer program according to the third aspect is stored.

The present invention is based on and includes the finding that the above object may be achieved by assisting the motor vehicle when merging into a traffic lane in such a way that the lateral guidance and/or longitudinal guidance of the motor vehicle is/are remotely controlled. This may yield the technical advantage, for example, that the motor vehicle may be efficiently assisted during a merging process into a traffic lane.

Thus, this may yield, in particular, the technical advantage that a concept is provided for the efficient, at least assisted, merging of a motor vehicle into a traffic lane.

An assisted merging includes, in particular, the case in which only the lateral guidance or only the longitudinal guidance of the motor vehicle is remotely controlled. The wording "assisted merging" includes, in particular, the case in which both the lateral guidance as well as the longitudinal guidance of the motor vehicle is remotely controlled.

In the case in which the remote control signals are provided for controlling the lateral guidance or the longitudinal guidance of the motor vehicle, it is provided according to one specific embodiment that the corresponding other guidance, i.e., the longitudinal guidance or the lateral guidance, is either manually controlled by the driver or is at least semi-automatically controlled, in order to drive the vehicle in an at least semi-automated manner, in order to merge the vehicle in an assisted manner.

The wording "drive in at least a semi-automated manner" includes one or multiple of the following cases: semi-automated driving, highly automated driving, fully automated driving.

"Semi-automated driving" means that in a specific situation (for example: driving on an expressway, driving within a parking facility, passing an object, driving within a lane defined by lane markings) and/or for a certain period of time, a longitudinal guidance and a lateral guidance of the motor vehicle are automatically remotely controlled. A driver of the motor vehicle does not have to manually control the longitudinal guidance and the lateral guidance of the motor vehicle himself/herself. The driver must, however, continuously monitor the automatic remote control of the longitudinal guidance and the lateral guidance, in order to be able to manually intervene if necessary. The driver must be ready to take complete control of the vehicle guidance at any time.

"Highly automated driving" means that for a certain period of time in a specific situation (for example: driving on an expressway, driving within a parking facility, passing an object, driving within a lane defined by lane markings), a longitudinal guidance and a lateral guidance of the motor vehicle are automatically remotely controlled. A driver of the motor vehicle does not have to manually control the longitudinal guidance and the lateral guidance of the motor vehicle himself/herself. The driver does not have to continuously monitor the automatic remote control of the longitudinal guidance and the lateral guidance in order to be able to manually intervene if necessary. A take control request is automatically output to the driver if necessary for taking control of the longitudinal guidance and lateral guidance, in particular, output with a sufficient time reserve. Thus, the driver must potentially be able to take control of the longitudinal guidance and the lateral guidance. Limits to the automatic remote control of the lateral guidance and the longitudinal guidance are recognized automatically. During highly-automated driving, it is not possible to automatically initiate a minimal risk state in every initial situation.

"Fully automated driving" means that in a specific situation (for example: driving on an expressway, driving within a parking facility, passing an object, driving within a lane defined by lane markings), a longitudinal guidance and a lateral guidance of the motor vehicle are automatically remotely controlled. A driver of the vehicle does not have to manually control the longitudinal guidance and lateral guidance of the motor vehicle himself/herself. The driver does not have to continually monitor the automatic remote control of the longitudinal guidance and the lateral guidance in order to be able to manually intervene if necessary. Prior to a termination of the automatic remote control of the lateral guidance and the longitudinal guidance, a request is automatically made to the driver to take over the driving task (controlling the lateral guidance and the longitudinal guidance of the motor vehicle), in particular, with a sufficient time reserve. If the driver does not take over the driving task, a return is automatically made to a state with minimal risk. Limits of the automatic control of the lateral guidance and the longitudinal guidance are automatically recognized. In all situations, it is possible to return to a minimal risk system state.

According to one specific embodiment of the present invention, it is provided that safety condition signals are received, which represent at least one safety condition that must be met so that the motor vehicle may be remotely controlled, it being checked whether the at least one safety condition is met, the remote control signals being generated based on a result of the check of whether the at least one safety condition is met.

This may yield, for example, the technical advantage that the remote control signals may be efficiently generated. This may yield, in particular, the technical advantage that it may be efficiently assured that particular requirements, in the present case, the safety condition, are met for remotely controlling the motor vehicle. Thus, this may yield, in particular, the technical advantage that if the safety condition is met, the remote control of the motor vehicle is safely possible.

According to one specific embodiment of the present invention, it is provided that the at least one safety condition is in each case an element selected from the following groups of safety conditions: presence of a predetermined safety integrity level (SIL) or automotive safety integrity level (ASIL) of at least the motor vehicle and of an infrastructure, in particular, including a communication path and/or communication component (for example, communication interface), for remotely controlling a motor vehicle, in particular, with respect to the entire systems in the motor vehicle and in the infrastructure and, in particular, parts; for example, components, algorithms, interfaces, etc., presence of a maximum latency period of a communication between the motor vehicle and a remote control unit for remotely controlling the motor vehicle based on the remote control signals, presence of a predetermined computer protection level of a device for carrying out the steps of the method according to the first aspect, presence of predetermined components and/or algorithms and/or communication options, which are used for carrying out the steps of the method according to the first aspect, presence of a redundancy and/or of a diversity in predetermined components and/or in algorithms and/or in communication options, which are used for carrying out the steps of the method according to the first aspect, presence of predetermined availability indications, which indicate an availability of predetermined components and/or of algorithms and/or of communication options, presence of predetermined quality criteria of the predetermined components and/or of algorithms and/or of communication options, presence of a plan that includes measures for reducing error and/or measures in the case of failures of predetermined components and/or of algorithms and/or of communication options and/or measures for error analyses and/or measures in the case of misinterpretations, presence of one or of multiple fall-back scenarios, presence of a predetermined function, presence of a predetermined traffic situation, presence of predetermined weather, maximum possible time for respectively carrying out and/or executing one step or multiple steps of the method according to the first aspect, presence of a check result that elements and/or functions that are used for carrying out the method according to the first aspect presently function correctly.

A communication path is, for example, a communication path between the device according to the second aspect and the motor vehicle. A communication path includes, for example, one or multiple communication channels.

In one specific embodiment of the present invention, a component that is used for carrying out the method according to the first aspect is an element selected from the following group of components: surroundings sensor, motor vehicle, infrastructure, remote control unit, device according to the second aspect, motor vehicle system, in particular, drive system, clutch system, braking system, driver assistance system, communication interface of the motor vehicle and/or of the infrastructure, processor, input, output of the device according to the second aspect.

In one specific embodiment of the present invention, a function that is used for carrying out the method according to the first aspect, is an element selected from the following group of functions: remote control function, communication function between the motor vehicle and the infrastructure and/or of the remote control unit, evaluation function of surroundings sensor data of a surroundings sensor, planning function, in particular, drive planning function, traffic analysis function.

A computer protection level defines, in particular, the following: activated firewall and/or valid encryption certificate for encrypting a communication between the motor vehicle and the infrastructure or the remote control unit and/or activated virus program including updated virus signatures and/or presence of a protection, in particular, of a mechanical protection, in particular, of an intrusion protection, of the computer, in particular, of the device according to the second aspect and/or of the remote control unit and/or presence of a possibility of checking that signals, in particular, remote control signals or signals from the surroundings have been transferred correctly, i.e., in an error-free manner.

An algorithm includes, for example, the computer program according to the third aspect.

Checking, in particular, that a redundancy and/or a diversity in predetermined components and/or in algorithms and/or in communication options is/are present yields, for example, the technical advantage that upon failure of the corresponding component, for example, of a computer or of the corresponding algorithm or of the corresponding communication option, a secure function may still be carried out.

To ensure that results are correct, the results may, according to one specific embodiment of the present invention, be calculated multiple times, for example, corresponding results may be compared with one another. Only upon agreement of the result is it determined, for example, that the results are correct. If a number is odd multiple times, it may be provided, for example, that the result corresponding to the highest number of identical results is determined to be correct.

Remote control signals are generated, for example, only when it may be determined that the result is correct.

In one specific embodiment of the present invention, it is provided that the remote control signals are generated only when the at least one safety condition is met.

In one specific embodiment of the present invention, it is provided that the check whether the at least one safety condition is met is carried out before and/or after and/or during one or multiple predetermined method steps.

This may yield, in particular, the technical advantage that it may be efficiently ensured that particular requirements, in the present case, the safety condition, for a remote control of the motor vehicle are met before and/or after and/or during the implementation of the corresponding method steps. Thus, this may yield, in particular, the technical advantage that when the safety condition is met, the remote control of the motor vehicle is then safely possible.

In one specific embodiment of the present invention, it is provided that after outputting the remote control signals, a remote control of the motor vehicle based on the output remote control signals is checked in order to detect an error, upon detection of an error, the remote control being aborted or emergency remote control signals being generated and output in a case of emergency for remotely controlling the lateral guidance and/or the longitudinal guidance of the motor vehicle.

The emergency remote control signals are, for example, of the type that during a remote control of the lateral guidance and/or the longitudinal guidance of the motor vehicle based on the emergency remote control signals, the motor vehicle is transitioned to a safe state, in particular, is stopped.

In one specific embodiment of the present invention, it is provided that after outputting the remote control signals, a remote control of the motor vehicle is checked based on the output remote control signals in order to detect an error, upon detection of an error, the remote control being aborted or on-board emergency control signals being generated and output for controlling the lateral guidance and/or the longitudinal guidance of the motor vehicle in a case of emergency.

The on-board emergency control signals are, for example, of the type that when controlling the lateral guidance and/or the longitudinal guidance of the motor vehicle based on the on-board emergency control signals, the motor vehicle is transferred to a safe state, in particular, is stopped.

On-board emergency control signals are thus emergency control signals, which the motor vehicle itself generates or which are generated in the motor vehicle.

This may yield, for example, the technical advantage that even upon a failure of a communication, which corresponds to a case of emergency, for example, between the motor vehicle and the device according to the second aspect or the remote control unit for remotely controlling the motor vehicle, the motor vehicle itself is able to transition into a safe state.

Embodiments of the present invention, which are made in conjunction with the remote control signals or the on-board emergency control signals, apply similarly to the emergency remote control signals and vice versa.

According to one specific embodiment of the present invention, it is provided that merging request signals are received, which represent a request for an at least assisted merging of a motor vehicle into the traffic lane, it being determined based on the request that a motor vehicle is to be merged into the traffic lane.

This may yield, for example, the technical advantage that the method may be efficiently initiated. This may yield, in particular, the technical advantage that it may be efficiently determined that a motor vehicle is to be merged into the traffic lane.

According to one specific embodiment of the present invention, it is provided that signals from the traffic lane surroundings are received, which represent traffic lane surroundings of the traffic lane, the signals from the traffic lane surroundings being processed in order to detect a motor vehicle to be merged into the traffic lane, it being determined based on the processing of the signals from traffic lane surroundings that a motor vehicle is to be merged into the traffic lane.

This may yield, for example, the technical advantage that it may be efficiently determined that a motor vehicle is to be merged into the traffic lane. This may yield, in particular, the technical advantage that a motor vehicle to be merged may be efficiently detected.

According to one specific embodiment of the present invention, it is provided that identification signals are received, which represent a respective identification of at least one of the motor vehicles, of an owner of the motor vehicle, and of a driver of the motor vehicle (i.e., a respective identification of the motor vehicle and/or of an owner of the motor vehicle and/or of a driver), the remote control signals being generated based on the respective identification.

This may yield, for example, the technical advantage that the remote control signals may be efficiently generated. This means, therefore, in particular, that the remote control of the lateral guidance and/or of the longitudinal guidance of the motor vehicle may be a function of the respective identification.

Thus, for example, particular drivers, who in the past have paid no fees for the assisted merging may be efficiently excluded for an instantaneous assisted merging. In this way, drivers may, in particular, be identified, who in the past have abused the assisted merging, so that the corresponding drivers may also be excluded.

According to one specific embodiment of the present invention, it is provided that at least one motor vehicle parameter is received, the remote control signals being generated based on the at least one motor vehicle parameter.

This may yield, for example, the technical advantage that the remote control signals may be efficiently generated. In this way, the remote control signals may, in particular be efficiently generated for the specific motor vehicle. Thus, for example, a maximum possible motor vehicle speed, a maximum possible motor vehicle acceleration, an instantaneous motor vehicle load and/or an instantaneous motor vehicle weight may be efficiently taken into account.

According to one specific embodiment of the present invention, it is provided that lacking a reception of at least one motor vehicle parameter, the remote control signals are generated based on a motor vehicle standard parameter corresponding to the at least one motor vehicle parameter.

This may yield, for example, the technical advantage that it is possible to efficiently react to missing motor vehicle parameters.

According to one specific embodiment of the present invention, it is provided that the at least one motor vehicle parameter is in each case an element selected from the following group of motor vehicle parameters: maximum possible motor vehicle speed, maximum possible motor vehicle acceleration, instantaneous motor vehicle load, instantaneous motor vehicle weight, length, width and height.

This may yield, for example, the technical advantage that particularly suitable motor vehicle parameters may be used.

According to one further specific embodiment of the present invention, it is provided that driving maneuver signals are received, which represent an instantaneous and/or a planned driving maneuver by at least one road user, in particular, a further motor vehicle, in the surroundings of the motor vehicle, the remote control signals being generated based on the driving maneuver signals.

This may yield, for example, the technical advantage that the remote control signals may be efficiently generated. This may yield, in particular, the technical advantage that it is possible to efficiently react to driving maneuvers, i.e., in particular to an instantaneous and/or to a planned driving maneuver by at least one road user in the surroundings of the motor vehicle.

According to one specific embodiment of the present invention, it is provided that a road user is one of the following road users: a further motor vehicle, a bicyclist, a truck, a motorcycle or a pedestrian.

According to one specific embodiment of the present invention, it is provided that one or multiple method steps, except for the steps of generating and outputting the remote control signals, are carried out on board the motor vehicle and/or one or multiple method steps being carried out off board the motor vehicle, in particular, in an infrastructure, preferably in a cloud infrastructure.

This may yield, for example, the technical advantage that the corresponding method steps may be efficiently redundantly carried out. This may, in particular, advantageously further increase a safety.

According to one specific embodiment of the present invention, it is provided that one or multiple method steps are documented, in particular, documented in a block chain.

This may yield, for example, the technical advantage that after carrying out or executing the method, the block chain may be subsequently analyzed based on the documentation. Documenting in a block chain yields, in particular, the technical advantage that the documentation is tamper-proof and forgery-proof.

A block chain is, in particular, a continually expandable list of data sets, called "blocks," which are linked to one another with the aid of one or of multiple cryptographic methods. Each block in this case contains, in particular, a cryptographically secure hash (variance coefficient) of the preceding block, in particular, a time stamp and, in particular, transaction dates.

According to one specific embodiment of the present invention, it is provided that the method according to the first aspect is a computer-implemented method.

According to one specific embodiment of the present invention, it is provided that the method according to the first aspect is executed or carried out with the aid of the device according to the second aspect.

Device features result analogously from corresponding method features and vice versa. Thus, this means, in particular, that technical functions of the device according to the second aspect result analogously from corresponding technical functionalities of the method according to the first aspect and vice versa.

The wording "at least one" stands for, in particular, "one or multiple."

The German abbreviation "bzw." stands for "or," which stands for, in particular, "respectively."

The wording "respective" stands for, in particular, "and/or."

The terms lane and traffic lane may be used synonymously.

BRIEF DESCRIPTION OF THE DRAWINGS

Exemplary embodiments of the present invention are represented in the figures and explained in greater detail below.

DETAILED DESCRIPTION OF EXAMPLE EMBODIMENTS

Identical reference numerals may be used in the following for identical features.

Figure 1:
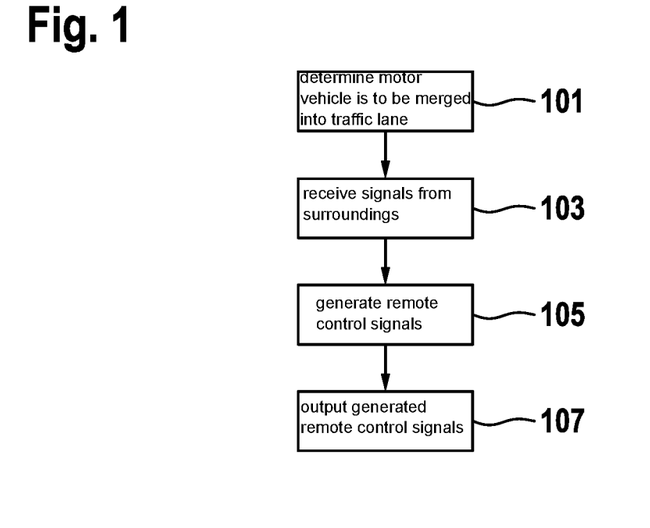
FIG. 1 shows a flowchart of a method for the at least assisted merging of a motor vehicle into a traffic lane, in accordance with an example embodiment of the present invention.

FIG. 1 shows a flowchart of a method for the at least assisted merging of a motor vehicle into a traffic lane.

The method includes the following steps:

determining 101 that a motor vehicle is to be merged into the traffic lane, receiving 103 signals from the surroundings, which represent surroundings of the motor vehicle that at least partially include the traffic lane, generating 105 remote control signals for remotely controlling a lateral guidance and/or a longitudinal guidance of the motor vehicle based on the signals from the surroundings in order to at least assist the motor vehicle, during a remote control based on the remote control signals, in merging into the traffic lane, outputting 107 the generated remote control signals.

According to one specific embodiment, it is provided that the method according to the first aspect includes remotely controlling the motor vehicle based on the generated remote control signals.

Figure 2:
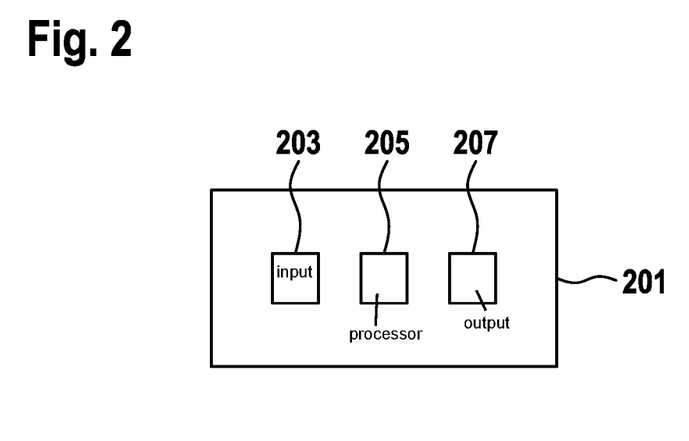
FIG. 2 shows a device, in accordance with an example embodiment of the present invention.

FIG. 2 shows a device 201.

Device 201 is configured to carry out all steps of the method according to the first aspect.

Device 201 includes an input 203, which is configured to receive the signals from the surroundings.

The device 201 further includes a processor 205, which is configured to carry out the step of determining. For example, processor 205 is configured to determine, based on the signals from the surroundings, that a motor vehicle is to be merged into the traffic lane.

Processor 205 is further configured to generate remote control signals.

Device 201 further includes an output 207, which is configured to output the generated remote control signals.

For example, the outputting of the generated remote control signals according to one specific embodiment includes sending the remote control signals via a communication network, in particular, via a wireless communication network, to the motor vehicle.

In general, signals that are received, are received with the aid of input 203. Input 203 is thus configured, in particular, to receive the corresponding signals.

In general, signals that are output, are output with the aid of output 207. Output 207 is thus configured, in particular, to output the corresponding signals.

According to one specific embodiment, instead of the one processor 205, multiple processors are provided.

According to one specific embodiment, it is provided that processor 205 is configured to carry out the steps of generating and/or of checking and/or of determining described previously and/or below.

Device 201 is, for example, part of an infrastructure, in particular, a cloud infrastructure.

Figure 3:
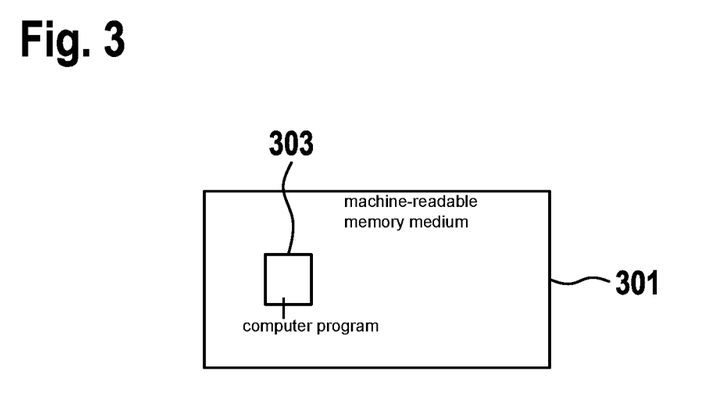
FIG. 3 shows a machine-readable memory medium, in accordance with an example embodiment of the present invention.

FIG. 3 shows a machine-readable memory medium 301.

A computer program 303, which includes commands which, upon execution of computer program 303 by a computer, prompt the computer to carry out a method according to the first aspect, is stored on machine-readable memory medium 301.

According to one specific embodiment, device 201 includes a remote control unit, which is configured to remotely control the motor vehicle based on the generated remote control signals.

According to one specific embodiment, an infrastructure or an infrastructure system is provided, which includes, for example, the device according to the second aspect.

The infrastructure includes, for example, an expressway entrance.

Figure 4:
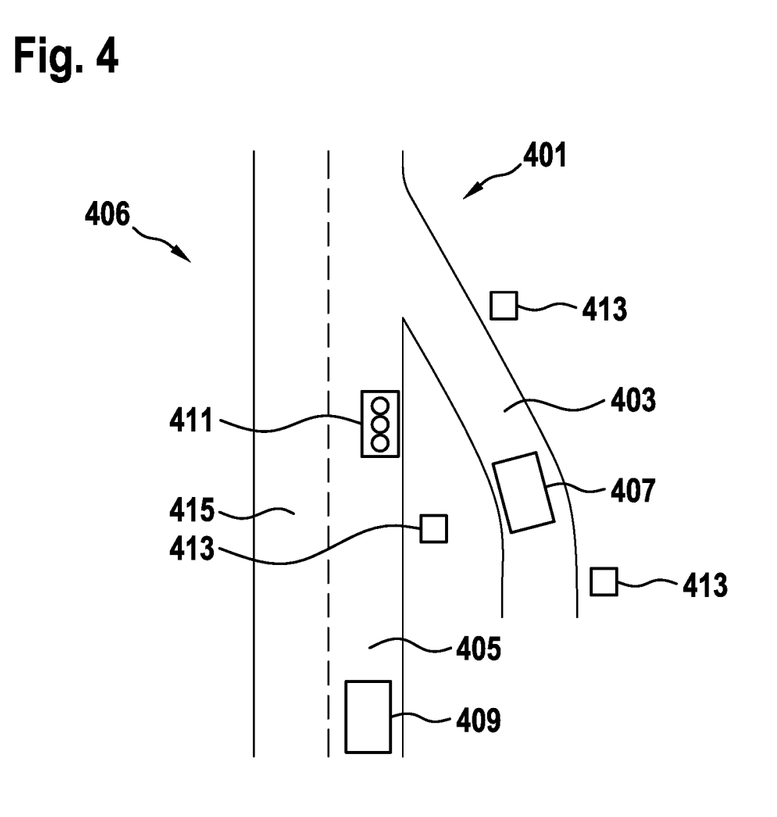
FIG. 4 shows a first expressway entrance.

FIG. 4 shows a first expressway entrance 401.

Expressway entrance 401 includes an acceleration lane or merging lane 403.

Acceleration lane 403 opens into a traffic lane 405 of an expressway 406.

A first motor vehicle 407 is traveling on merging lane or acceleration lane 403. First motor vehicle 407 intends to merge onto traffic lane 405.

A second motor vehicle 409 is traveling on traffic lane 405.

Provided above traffic lane 405 is a light signal system 411.

Multiple surroundings sensors 413 are situated in a spatially distributed manner in the surroundings of merging lane 403 and of traffic lane 405.

These surroundings sensors 413 detect their respective surroundings and provide corresponding surroundings sensor data to the detected surroundings.

The surroundings signals are based, for example, on the surroundings sensor data and/or include the surroundings sensor data.

Based on the respective detection, motor vehicle 407 to be merged, i.e., first motor vehicle 407, may, for example, be detected. Based on the respective detection, second motor vehicle 409 may, for example, be detected.

For example, it is provided that upon detection of motor vehicle 407 to be merged, light signal system 411 is controlled in such a way that it visually blocks lane 405 for second motor vehicle 409.

Thus, this means, in particular, that second motor vehicle 409 must then change to an adjacent lane 415. First motor vehicle 407 may then efficiently merge into lane 405.

A surroundings sensor within the context of the description is, for example, one of the following surroundings sensors: video sensor, infrared sensor, magnetic field sensor, LIDAR sensor, ultrasonic sensor and radar sensor.

Based on the respective detection, i.e., in particular, based on the corresponding signals from the surroundings, the remote control signals are then generated and output, as described above and/or below, so that first motor vehicle 407 may merge at least assisted into lane 405.

Figure 5:
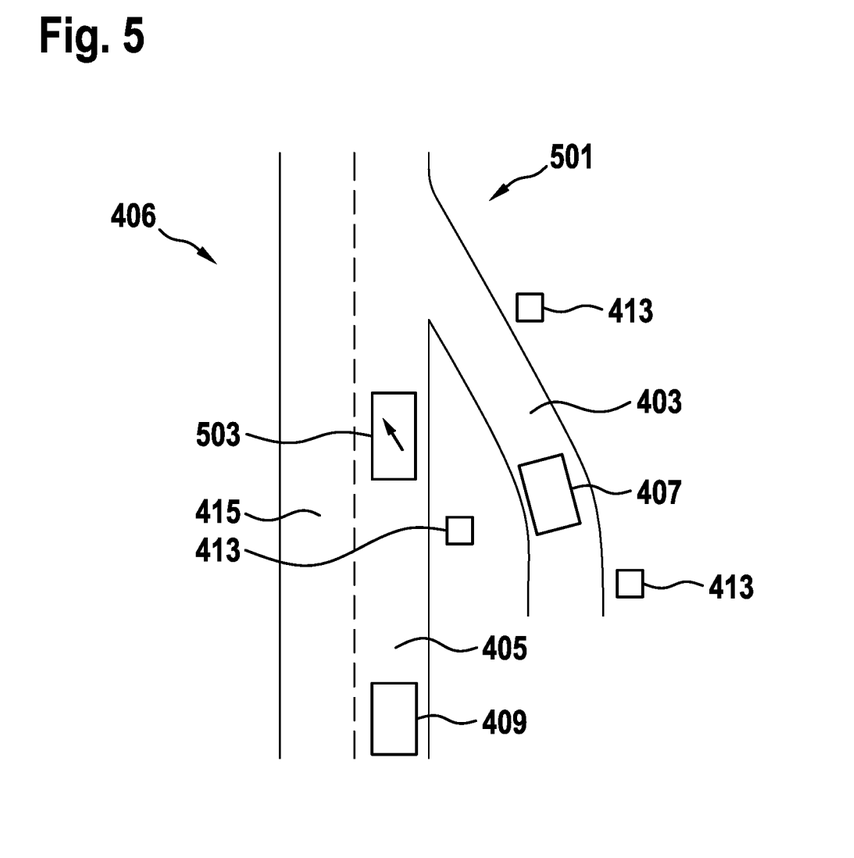
FIG. 5 shows a second expressway entrance.

FIG. 5 shows a second expressway entrance 501.

Second expressway entrance 501 is formed essentially similarly to first expressway entrance 401. As a difference, an electronic sign 503 instead of light signal system 411 is provided which, upon detection of a motor vehicle to be merged, is controlled in such a way that electronic sign 503 visually signals second motor vehicle 409 with the aid of a display unit (not shown) that it must change lane 405.

Thus, similar to light signal system 411, lane 405, into which first motor vehicle 407 intends to merge, is then free of traffic. In this way, the merging may then be carried out remotely in an efficient manner.

Although it could appear that light signal system 411 and electronic sign 503 are located on lane 405, it should be made clear at this point that this is not the case. Instead, light signal system 411 and electronic sign 503 are situated above lane 405.

Figure 6:
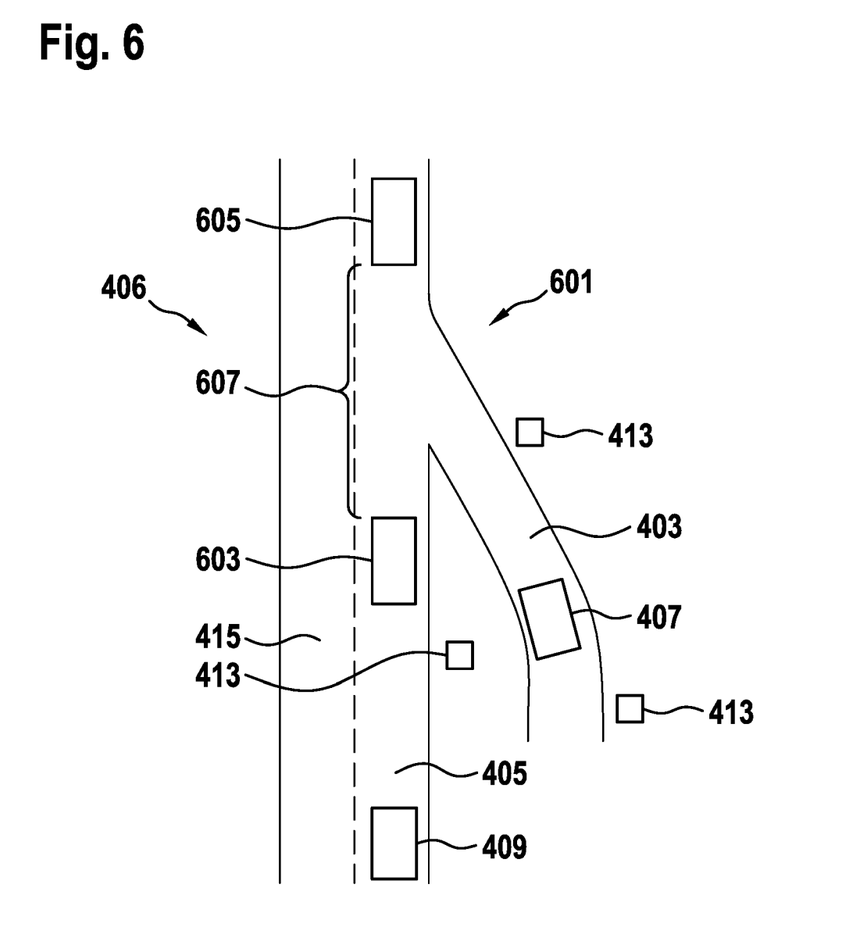
FIG. 6 shows a third expressway entrance.

FIG. 6 shows a third expressway entrance 601.

Third expressway entrance 601 is formed essentially similarly to first expressway entrance 401 and second expressway entrance 501. As a difference, neither a light signal system 411 nor an electronic sign 503 is provided.

For example, a third motor vehicle 603 and a fourth motor vehicle 605 are depicted, which are traveling on lane 405. A gap between third motor vehicle 603 and fourth motor vehicle 605 is marked with a bracket including reference numeral 607.

The generated remote control signals are, in particular, of the type that when remotely controlling the lateral guidance and/or the longitudinal guidance of motor vehicle 407 based on the remote control signals, motor vehicle 407 is merged into gap 607.

According to one specific embodiment, it is checked whether an instantaneous traffic situation allows an intervention, i.e., in particular a remote control, in order, for example, to prevent other road users in the surroundings of the motor vehicle from being injured.

According to one specific embodiment, it is provided that the process, i.e., the method, in other words, the method steps, are documented in a forgery-proof and comprehensible manner, for example, documented in a block chain.

According to one specific embodiment, it is provided that a driver of the motor vehicle is informed that an intervention in the driving operation of the motor vehicle has taken place or is taking place, i.e., that the motor vehicle has been remotely controlled or is being remotely controlled.

Thus, this means, in particular, that communication signals are generated and output, which represent a corresponding communication. For example, the communication signals are output to a human-machine interface of the motor vehicle, so that the driver is informed of the intervention or of the remote control based on the communication signals with the aid of the human-machine interface.

According to one specific embodiment, it is provided that the intervention or the remote control of the motor vehicle is/are communicated to an authority so that the latter is able, for example, to initiate further steps.

According to one specific embodiment, a requirement for the remote control or for the intervention is that the remote control is safe. The German word "Sicker" means within the context of the description, in particular, "safe" and "secure." These two English terms are normally translated into German as "sicker." Nevertheless, these terms in English have partially different meanings.

The English term "safe" is directed, in particular, to the issue of accident and accident avoidance. A remote control that is "safe" ensures that a probability of an accident or of a collision is less than or less than-equal to a predetermined probability threshold value.

The term "secure" is directed, in particular, to the issue of computer protection or hacker protection, i.e., in particular, how securely is a (computer) infrastructure and/or a communication infrastructure, in particular, a communication path between a motor vehicle and a remote control unit for remotely controlling a motor vehicle, safeguarded from unauthorized accesses or from data manipulation by third parties ("hackers").

Thus, a remote control that is "secure" has, in particular, as a basis an appropriate and sufficient computer protection or hacker protection.

According to one specific embodiment, for example, it is checked whether the totality made up of motor vehicle and infrastructure involved in the method according to the first aspect, including a communication between infrastructure and motor vehicle, is instantaneously secure for the concept "intervention in the motor vehicle for critical actions" described herein. Thus, this means, in particular, that the motor vehicle and/or a local and/or a global infrastructure and/or a communication is/are checked accordingly. The remote control signals are generated based, in particular, on a result of the check.

Thus, this means, in particular, that the components, which are used when carrying out the method according to the first aspect, are checked for safety, i.e., whether these meet particular safety conditions before the intervention into the driving operation is carried out, i.e., the motor vehicle is remotely controlled.

Important and related criteria are, for example, one or multiple of the previously described safety conditions.

According to one specific embodiment, it is provided that on the one hand the entire system (motor vehicle, infrastructure, communication path, cloud, etc.) is checked with respect to the safety condition.

According to one specific embodiment, it is provided that the individual parts are also checked with respect to meeting the safety condition. This, in particular, before remotely controlling the motor vehicle.

The step or steps of checking in this case are carried out in one specific embodiment on board the motor vehicle and/or off board the motor vehicle, in particular, in an infrastructure.

According to one specific embodiment, it is provided that the step or steps of checking is or are checked subsequently, i.e., at a later point in time, for example, regularly. For example, the step or steps of checking is or are checked subsequently at a predetermined frequency, for example, every 100 ms.

For example, this check, i.e., the check whether the at least one safety condition is met, according to one specific embodiment, takes place before and/or after and/or during one or multiple predetermined method steps.

According to one specific embodiment, the check is carried out or executed in the case of problems.

In one specific embodiment, a structure of a communication link is provided between a motor vehicle and an infrastructure, which includes, in particular, the device according to the second aspect.

The infrastructure according to one specific embodiment includes a local infrastructure, for example, at the lane to be merged into, for example, at the expressway.

The infrastructure according to one specific embodiment includes a global infrastructure, preferably a cloud infrastructure.

In one specific embodiment, it is checked whether the functionality "assisted merging" may be provided.

In one specific embodiment, it is checked whether the infrastructure is functionally ready and/or is available for the assisted merging.

In one specific embodiment, it is checked whether the motor vehicle is functionally ready and/or is available for the assisted merging.

In one specific embodiment, it is checked whether the service or the functionality "assisted merging" is made available for the motor vehicle (or driver or owner) requesting the functionality.

This both, in particular, at the motor vehicle level, at the infrastructure level, at the service level. For example, it is provided that a provider of the functionality "assisted merging" no longer authorizes the requesting motor vehicle or its owner and its driver due to fees not paid in the past or due to abuses.

In one specific embodiment, an ascertainment and/or a reception (and, in particular, a transfer) of motor vehicle possibilities (the motor vehicle parameters described previously and below) (for example, maximum possible acceleration and/or speed, etc.) are provided. For example, motor vehicle parameters are sent by the motor vehicle. Thus, this means that, for example, motor vehicle parameters sent by the motor vehicle are received.

For example, motor vehicle parameters are sent from the cloud, in particular, by a cloud server. Thus, this means that, for example, motor vehicle parameters sent by the cloud, in particular by a cloud server, are received.

If this is not possible (for example, due to missing data), a defined standard configuration (preferably an emergency configuration) is then used.

In one specific embodiment, a check is provided whether the traffic situation allows for the motor vehicle to be able to be merged in an assisted manner. This check preferably runs continuously, i.e., permanently—i.e., even before a corresponding request, i.e., regardless of a request.

Other road users in one further specific embodiment preferably also send—if possible—via V2X their instantaneous and planned driving maneuvers to the motor vehicle and/or to the cloud server.

In one specific embodiment, a calculation or ascertainment is provided whether a merging into a gap in the traffic on the lane in which merging is to take place, is possible.

The calculation or ascertainment is/are carried out, for example, in the motor vehicle and/or in the infrastructure. If this is carried out in both the motor vehicle as well as in the infrastructure, a redundancy may be advantageously ensured, which may increase a safety.

If merging is possible, the motor vehicle is distantly remotely controlled. The guidance of the motor vehicle is thus taken over by the infrastructure. Intelligence, decision and control lie with the infrastructure.

The motor vehicle travels, for example, guided remotely from the entrance onto the expressway.

The process of merging in this case preferably continues to be checked.

The check is carried out in this case according to one or to multiple of the following possibilities:
  in the motor vehicle, in the infrastructure or in both the motor vehicle as well as in the infrastructure, the latter being able to advantageously ensure a redundancy, which may increase a safety.

The entire process starts preferably very early, so that the motor vehicle does not have to stop on the entrance. This means the speed does not have to be reduced.

The motor vehicle preferably does not stop on the entrance, but starts to accelerate immediately.

In one further variant—preferably on heavily trafficked roads—and/or if no gap has been found after a defined period of time, the traffic is stopped and/or redirected onto another lane. That means, with traffic systems, such as light signal systems (including, for example, arrow signal generators) and/or an electronic sign, which is able to visually signal the redirection using visual arrows with the aid of a display device.

In one further specific embodiment, the lane in which a merge is to take place is automatically cleared for merging, i.e., already upon the request of a motor vehicle or of a driver for the functionality "assisted merging" and/or when an approach of the motor vehicle is automatically detected by an infrastructure.

What is claimed is:

1. A method for at least assisted merging of a motor vehicle into a traffic lane, the method comprising the following steps:
   determining that the motor vehicle is to be merged into the traffic lane, wherein the traffic lane includes a combination of two streams of traffic into a single lane;
   receiving signals from surroundings, which represent surroundings of the motor vehicle that at least partially include the traffic lane;
   generating remote control signals for remotely controlling a lateral guidance and/or a longitudinal guidance of the motor vehicle based on the signals from the surroundings to at least assist the motor vehicle during a remote control, based on the remote control signals, in merging into the traffic lane;
   outputting the generated remote control signals,
   receiving safety condition signals which represent at least one safety condition that has to be met, so that the motor vehicle may be remotely controlled; and
   checking whether the at least one safety condition is met, the remote control signals being generated based on a result of the check whether the at least one safety condition is met,
   wherein the safety condition includes a presence of a maximum latency period of a communication between the motor vehicle and a remote control unit for remotely controlling the motor vehicle based on the remote control signals,
   wherein a measured latency period of a communication between the motor vehicle and the remote control unit is compared to a predefined maximum latency period, and the remote control signals are generated when the measured latency period is less than the predefined maximum latency period.

2. The method as recited in claim 1, wherein the each of the at least one safety condition is an element further selected from the following groups of safety conditions:
   presence of a predetermined safety integrity level (SIL) or automotive safety integrity level (ASIL) of at least the motor vehicle and of an infrastructure including a communication path and/or communication component for remotely controlling a motor vehicle with respect to the entire systems in the motor vehicle and in the infrastructure including components, algorithms, and interfaces; presence of a predetermined computer protection level of a device for carrying out the steps of the method;
   presence of a redundancy and/or diversity in predetermined components and/or in algorithms and/or in communication options, which are used for carrying out the steps of the method; presence of predetermined availability indications, which indicate an availability of predetermined components and/or of algorithms and/or of communication options' presence of predetermined quality criteria of the predetermined components and/or of algorithms and/or of communication options;
   presence of a plan that includes measures for reducing errors and/or measures in the case of failures of predetermined components and/or of algorithms and/or of communication options and/or measures for error analyses and/or measures in the case of misinterpretations;
   presence of one or of multiple fall-back scenarios;
   presence of a predetermined function;
   presence of a predetermined traffic situation;
   presence of predetermined weather' maximum possible time for respectively carrying out or executing one step or multiple steps of the method;
   presence of a check result that elements or functions that are used for carrying out the method presently function correctly.

3. The method as recited in claim 1, wherein the remote control signals are generated only when the at least one safety condition is met.

4. The method as recited in claim 1, wherein the check whether the at least one safety condition is met is carried out before and/or after and/or during one or multiple predetermined method steps.

5. The method as recited in claim 1, wherein, after outputting the remote control signals, a remote control of the motor vehicle based on the output remote control signals is checked in order to detect an error, the remote control being aborted upon detection of an error or emergency remote control signals being generated and output in a case of emergency for remotely controlling the motor vehicle.

6. The method as recited in claim 1, further comprising:
   receiving merging request signals which represent a request for the at least assisted merging of the motor vehicle into the traffic lane; and
   determining based on the request that the motor vehicle is to be merged into the traffic lane.

7. The method as recited in claim 1, further comprising:
   receiving signals from traffic lane surroundings, which represent a traffic lane surroundings of the traffic lane;
   processing the signals from the traffic lane surroundings to detect the motor vehicle to be merged into the traffic lane; and
   determining based on the processing of the signals from the traffic lane surroundings that the motor vehicle is to be merged into the traffic lane.

8. The method as recited in claim 1, further comprising:
   receiving identification signals which represent an individual identification of the motor vehicle or an owner of the motor vehicle or a driver of the motor vehicle, wherein the remote control signals being generated based on the identification.

9. The method as recited in claim 1, further comprising:
   receiving at least one motor vehicle parameter, the remote control signals being generated based on the at least one motor vehicle parameter.

10. The method as recited in claim 1, wherein lacking a reception of at least one motor vehicle parameter, the remote control signals are generated based on a motor vehicle standard parameter corresponding to the at least one motor vehicle parameter.

11. The method as recited in claim 9, wherein the at least one motor vehicle parameter is in each case an element selected from the following group of motor vehicle parameters: maximum possible motor vehicle speed, maximum possible motor vehicle acceleration, instantaneous motor vehicle load, instantaneous motor vehicle weight, instantaneous motor vehicle length, instantaneous motor vehicle width, instantaneous motor vehicle height.

12. The method as recited in claim 1, further comprising: receiving driving maneuver signals which represent an instantaneous and/or a planned driving maneuver by at least one further motor vehicle, in the surroundings of the motor vehicle, wherein the remote control signals are generated based on the driving maneuver signals.

13. The method as recited in claim 1, wherein the remote control signals are generated in such a way that during a remote control of the lateral guidance and/or of the longitudinal guidance of the motor vehicle based on the generated remote control signals, the motor vehicle does not stop on a merging lane situated adjacent to the traffic lane, but accelerates immediately after negotiating the merging lane.

14. The method as recited in claim 1, wherein one or multiple method steps of the method, except for the steps of generating and outputting the remote control signals, are carried out on board the motor vehicle and/or one or multiple method steps are carried out off board the motor vehicle in an infrastructure.

15. The method as recited in claim 14, wherein the infrastructure is a cloud infrastructure.

16. The method as recited in claim 1, wherein one or multiple method steps of the method are documented in a block chain.

17. The method as recited in claim 1, further comprising: checking whether a totality made up of motor vehicle and infrastructure involved in the method, including a communication between infrastructure and motor vehicle, is secure, so that the motor vehicle and/or a local and/or a global infrastructure and/or a communication between a motor vehicle and the infrastructure is checked.

18. A device configured to at least assist merging of a motor vehicle into a traffic lane, the device configured to:
determine that the motor vehicle is to be merged into the traffic lane, wherein the traffic lane includes a combination of two streams of traffic into a single lane;
receive signals from surroundings, which represent surroundings of the motor vehicle that at least partially include the traffic lane;
generate remote control signals for remotely controlling a lateral guidance and/or a longitudinal guidance of the motor vehicle based on the signals from the surroundings to at least assist the motor vehicle during a remote control, based on the remote control signals, in merging into the traffic lane;
output the generated remote control signals,
receive safety condition signals which represent at least one safety condition that has to be met, so that the motor vehicle may be remotely controlled; and
check whether the at least one safety condition is met, the remote control signals being generated based on a result of the check whether the at least one safety condition is met,
wherein the safety condition includes a presence of a maximum latency period of a communication between the motor vehicle and a remote control unit for remotely controlling the motor vehicle based on the remote control signals,
wherein a measured latency period of a communication between the motor vehicle and the remote control unit is compared to a predefined maximum latency period, and the remote control signals are generated when the measured latency period is less than the predefined maximum latency period.

19. A non-transitory machine-readable memory medium on which is stored a computer program for at least assisted merging of a motor vehicle into a traffic lane, the computer program, when executed by a computer, causing the computer to perform the following steps:
determining that the motor vehicle is to be merged into the traffic lane, wherein the traffic lane includes a combination of two streams of traffic into a single lane;
receiving signals from surroundings, which represent surroundings of the motor vehicle that at least partially include the traffic lane;
generating remote control signals for remotely controlling a lateral guidance and/or a longitudinal guidance of the motor vehicle based on the signals from the surroundings to at least assist the motor vehicle during a remote control, based on the remote control signals, in merging into the traffic lane;
outputting the generated remote control signals,
receiving safety condition signals which represent at least one safety condition that has to be met, so that the motor vehicle may be remotely controlled; and
checking whether the at least one safety condition is met, the remote control signals being generated based on a result of the check whether the at least one safety condition is met,
wherein the safety condition includes a presence of a maximum latency period of a communication between the motor vehicle and a remote control unit for remotely controlling the motor vehicle based on the remote control signals,
wherein a measured latency period of a communication between the motor vehicle and the remote control unit is compared to a predefined maximum latency period, and the remote control signals are generated when the measured latency period is less than the predefined maximum latency period.

\* \* \* \* \*